(12) United States Patent  
Kampf et al.

(10) Patent No.: US 8,919,598 B2  
(45) Date of Patent: Dec. 30, 2014

(54) VACUUM INSULATION PANEL ASSEMBLY

(71) Applicant: AMTROL Licensing Inc., West Warwick, RI (US)

(72) Inventors: Christopher Gary Kampf, Hope Valley, RI (US); Christopher A. Van Haaren, Warwick, RI (US)

(73) Assignee: AMTROL Licensing Inc., West Warwick, RI (US)

( * ) Notice: Subject to any disclaimer, the term of this patent is extended or adjusted under 35 U.S.C. 154(b) by 0 days.

(21) Appl. No.: 13/712,312

(22) Filed: Dec. 12, 2012

(65) Prior Publication Data

US 2014/0157713 A1    Jun. 12, 2014

(51) Int. Cl.
| | |
|---|---|
| B65D 6/24 | (2006.01) |
| B65D 8/04 | (2006.01) |
| B65D 8/14 | (2006.01) |
| B65D 90/02 | (2006.01) |
| B65D 90/08 | (2006.01) |
| B65D 81/38 | (2006.01) |
| A47J 41/02 | (2006.01) |
| E04C 2/30 | (2006.01) |

(52) U.S. Cl.
CPC ............. *E04C 2/30* (2013.01); *Y10S 220/916* (2013.01)
USPC ............ 220/592.27; 220/4.04; 220/4.08; 220/4.09; 220/601; 220/612; 220/678; 220/680; 220/592.2; 220/618; 220/621; 220/916

(58) Field of Classification Search
USPC ............. 220/592.27, 4.12, 4.16, 4.04, 4.08, 220/4.09, 601, 612, 615, 623, 678, 680, 220/682, 592.2, 592.01, 617, 618, 621, 622, 220/4.17, 916, 625
See application file for complete search history.

(56) References Cited

U.S. PATENT DOCUMENTS

| | | | | | |
|---|---|---|---|---|---|
| 508,351 | A | * | 11/1893 | Shipe ..................... | 126/361.1 |
| 1,268,980 | A | * | 6/1918 | Krumholz ................. | 52/518 |
| 4,313,400 | A | * | 2/1982 | Walker et al. ............ | 122/31.1 |
| 4,579,242 | A | * | 4/1986 | Ellis, III ................ | 220/4.13 |
| 5,054,635 | A | * | 10/1991 | Kolom .................... | 220/4.15 |
| 5,217,140 | A | * | 6/1993 | Lindahl .................. | 220/4.06 |
| 5,228,585 | A | * | 7/1993 | Lutgen et al. ........... | 220/4.14 |
| 6,050,438 | A | * | 4/2000 | Kovens et al. ........... | 220/4.24 |
| 6,220,473 | B1 | * | 4/2001 | Lehman et al. ........... | 220/592.27 |
| 7,287,663 | B2 | * | 10/2007 | Vandal et al. ............ | 220/586 |
| 2010/0072211 | A1 | * | 3/2010 | Dickinson et al. ........ | 220/592.27 |

\* cited by examiner

*Primary Examiner* — Fenn Mathew  
*Assistant Examiner* — Jennifer Castriotta  
(74) *Attorney, Agent, or Firm* — Edwards Wildman Palmer LLP; Scott D. Wofsy; George N. Chaclas

(57) ABSTRACT

A vacuum insulation panel assembly having upper, lower, and first and second side vacuum insulation panels. The upper vacuum insulation panel has an aperture formed therethrough and an edge forming an overlap joint. The lower vacuum insulation panel also has an aperture formed therethrough and an edge forming an overlap joint. The first and second side vacuum insulation panels have an arcuate, half-cylindrical shape with a top edge forming an overlap joint configured to engage the overlap joint of the upper vacuum insulation panel, a bottom edge forming an overlap joint configured to engage the overlap joint of the lower vacuum insulation panel, and first and second side edges forming overlap joints configured to engage the overlap joints of the first and second side edges of the other side vacuum insulation panel.

10 Claims, 8 Drawing Sheets

VACUUM INSULATION PANEL ASSEMBLY

FIELD OF THE INVENTION

The present invention generally relates to vacuum insulation panels and, more particularly, to vacuum insulation panels for use in hot water or other tank applications.

BACKGROUND

Vacuum insulation panels (VIPs) have recently transitioned to being used as a standard insulator on refrigeration units in the appliance industry. The appliance/refrigerator manufacturers moved towards VIPs, and away from customary urethane spray insulation, to achieve greater efficiency performance and eliminate dangerous chlorofluorocarbons (CFCs), in an effort to improve the environment. The R-value performance of a VIP can be much higher than that of common urethane spray insulation, which typically runs between R6-R7/inch. This can give VIPs performance between 6 and 7 times the insulating performance of standard urethane spray insulation.

However, the standard shape of a VIP is a flat panel, which is used within flat rectangular sided units such as refrigerators and temperature controlled shipping containers. Therefore, while it could be beneficial, these flat panel VIPs cannot be used in more complex designs such as hot water heater tanks, expansion tanks, cold water tanks, gas tanks, etc., which frequently require top and bottom dome shapes as well as the side cylindrical shapes to completely surround the tank and provide the best possible insulation and heat loss performance.

SUMMARY

In one embodiment, a vacuum insulation panel assembly is provided having upper, lower, and first and second side vacuum insulation panels. The upper vacuum insulation panel has an aperture formed therethrough and an edge forming an overlap joint. The lower vacuum insulation panel also has an aperture formed therethrough and an edge forming an overlap joint. The first and second side vacuum insulation panels have an arcuate, half-cylindrical shape with a top edge top edge forming an overlap joint configured to engage the overlap joint of the upper vacuum insulation panel, a bottom edge forming an overlap joint configured to engage the overlap joint of the lower vacuum insulation panel, and first and second side edges forming overlap joints configured to engage the overlap joints of the first and second side edges of the other side vacuum insulation panel.

In another embodiment, a vacuum insulation panel is provided having an arcuate, dome shaped body. An aperture is formed through the body and an overlap joint is formed on an edge of the body.

In another embodiment, a vacuum insulation panel is provided having a body comprising first and second portions. The first portion of the body is arcuate and dome shaped and has an aperture. The second portion of the body is cylindrical, extends from an edge of the first portion, and has an overlap joint formed on an edge, distal from the first portion of the body.

DETAILED DESCRIPTION

The examples described herein provide a vacuum insulation panel assembly that can be used for hot water heater tank applications. However, it will be understood by those of skill in the art that the concepts shown in the examples could be used or modified to be used for other applications, such as expansion tanks, cold water tanks, gas tanks, etc.

Figure 1:
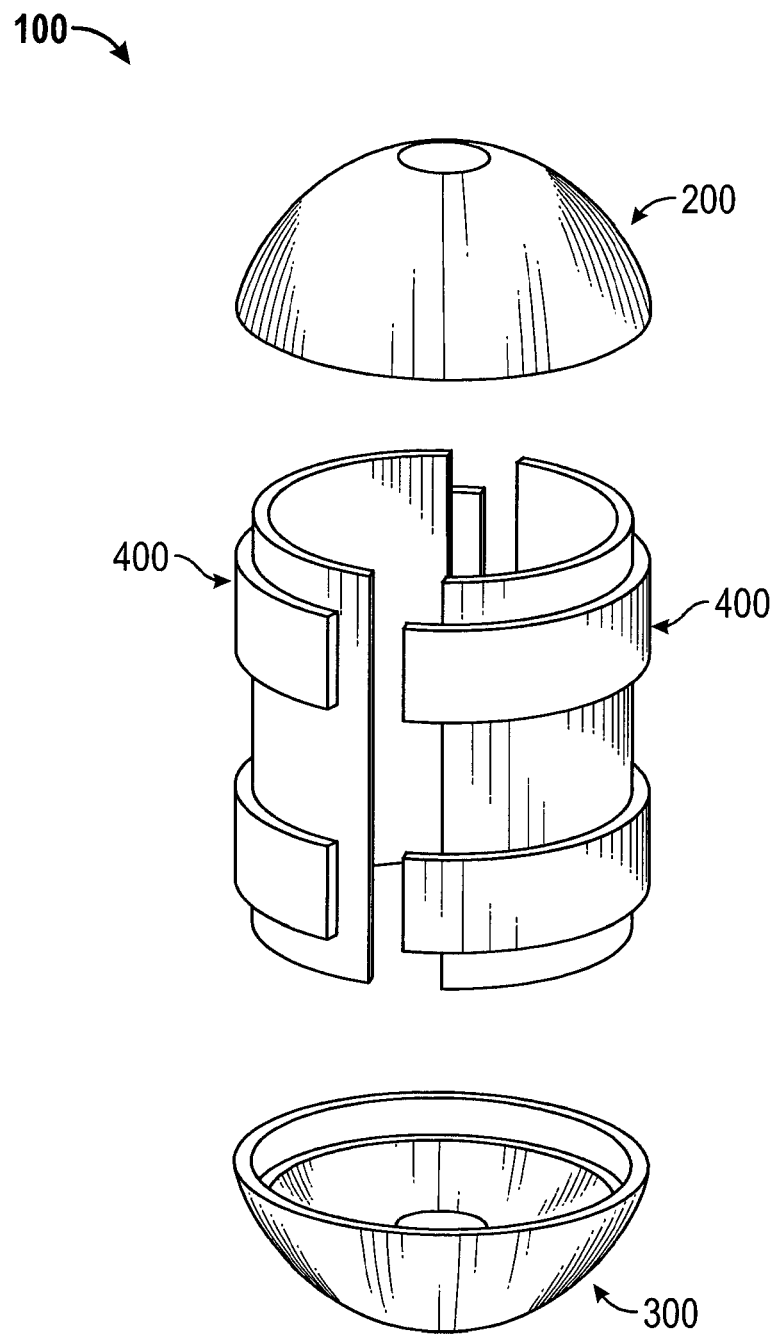
FIG. 1. is a n exploded of an example vacuum insulation panel assembly.

Referring to FIG. 1, an example vacuum insulation panel assembly 100 is shown, which generally includes an upper vacuum insulation panel 200, a lower vacuum insulation panel 300, and a pair of side vacuum insulation panels 400. The upper, lower, and side vacuum insulation panels 200, 300, 400 are assembled between an inner bottle/casing and an outer casing of the tank, as described in more detail below. Use of the example vacuum insulation panel assembly 100 described herein can improve the heat loss performance compared to existing designs, while maintaining the same thickness in design. For example, one existing design uses ¾ inch thick molded insulation halves that allow for a 1° to 1.25° F./hr heat loss. The halves are molded with a high density polyurethane material to achieve high compressive strength, which is required to keep the plastic inner bottle from expanding under pressure. However, due to the high compressive strength requirement, the insulation density is too high for good insulating properties. Conversely, the vacuum insulation panels described herein become rigid once a vacuum is applied to the panels, providing the compressive strength required, and also provide insulating and heat loss properties that greatly exceed those of current designs. For example, a vacuum insulation panel made by ThermoCor LLC has an R-value of approximately 45 R/inch compared to standard insulating materials, such as closed cell polyurethane (approximately 6 R/inch), expanded polyurethane (approximately 4 R/inch), or fiberglass (approximately 3.3 R/inch).

Figure 2A:
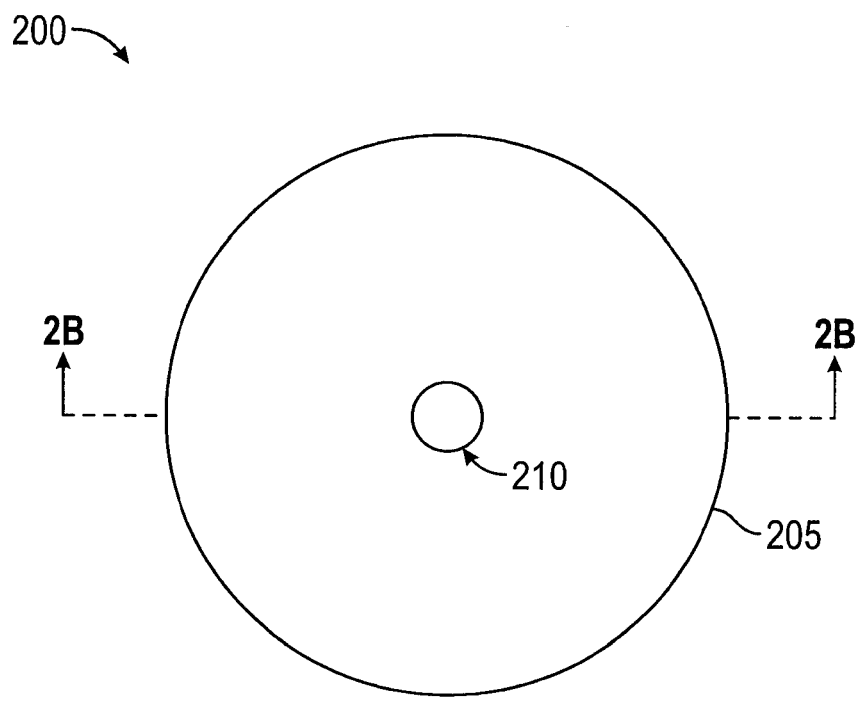
FIG. 2A is a top view of an example upper vacuum insulation panel.
Figure 2B:
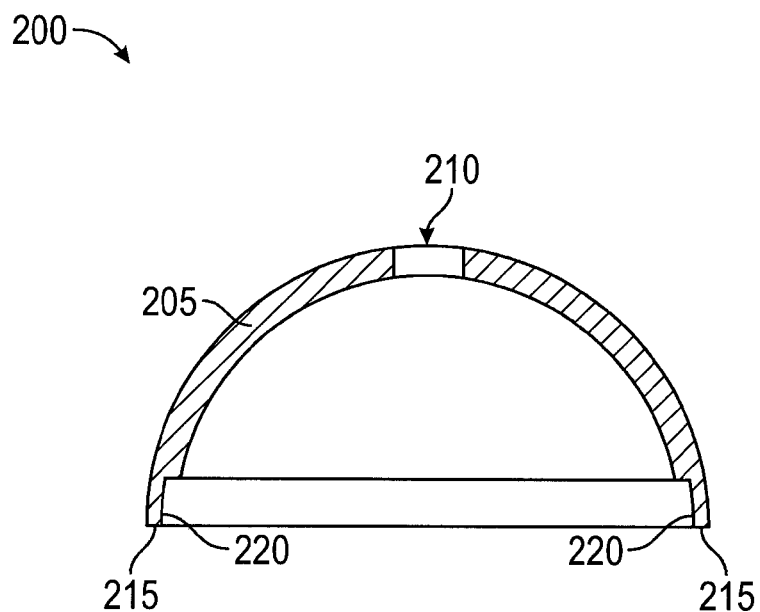
FIG. 2B is a cross-sectional view of the upper vacuum insulation panel of FIG. 2A taken along line 2B-2B.

Referring to FIGS. 2A and 2B, the example upper vacuum insulation panel 200 has a body 205 that is arcuate and generally dome shaped and has a thickness of approximately 0.5 inches. However, depending on the size and shape of the tank and the insulation properties desired, upper vacuum insulation panel 200 could have any shape desired, such as a flat disc, cylinder, cone, etc., and a thickness appropriate to the design and desired thermal properties. An aperture 210 is formed in the top of upper vacuum insulation panel 200 and is sized to allow passage of a nipple of the inner bottle/casing of the tank. Aperture 210 allows for a one piece dome shape vacuum insulation panel to be constructed by allowing the plumbing to go through the center of the panel. In the example shown, aperture 210 is approximately 1.25 inches in diameter. At the edge 215 of panel 200 an overlap joint 220 is formed, which is configured to engage another overlap joint in the side panels 400 and encapsulate side panels 400 to hold assembly 100 together when installed over an inner bottle/casing of the tank, as described in greater detail below. In the example shown, overlap joint 220 is formed by a recess, creating a lap joint that extends approximately 1.5 inches. Alternatively, overlap joint 220 could be any other overlap joint as well, such as a dove tail, tongue and groove, or miter joint, as long as there is some overlap of insulation to eliminate any potential gaps between panels. The single piece dome shape described above and shown in the figures can reduce or eliminate the edge effect heat loss that occurs with current multi-piece constructions.

Figure 5:
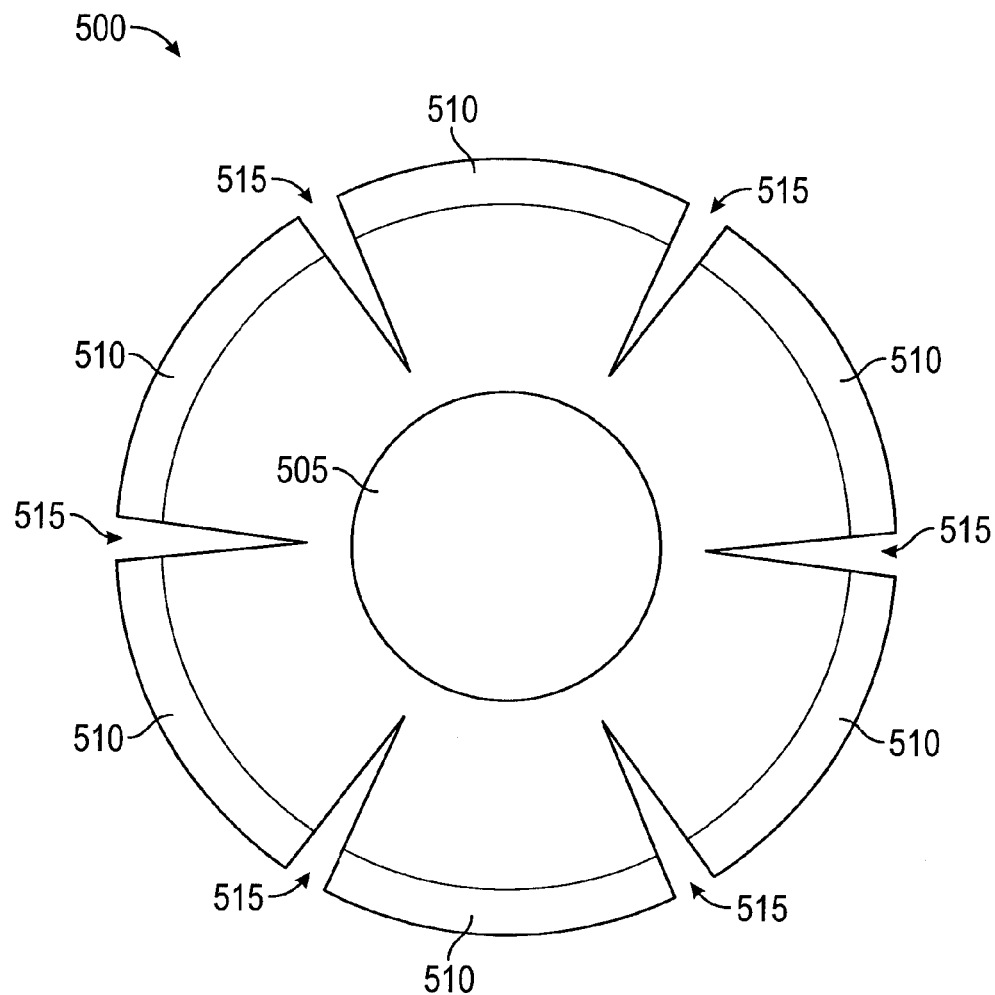
FIG. 5 is a top view of an example core for use in an upper or lower vacuum insulation panel.

To create upper vacuum insulation panel 200, a core 500 is first formed, as shown in FIG. 5, preferably from a glass micro-fiber or other suitable product. Core 500 starts as a generally flat disc and while core 500 can be a single integral piece, preferably core 500 is made from multiple thin sheets that together form the desired thickness of the upper vacuum insulation panel 200. An aperture 505 is formed in the center of core 500, which corresponds to aperture 210 in the final upper vacuum insulation panel 200. Aperture 505 can be formed slightly larger than the end size of aperture 210 to allow for material overhang once core 500 is sealed into a barrier bag. In addition, if multiple layers of material are used, the layers of core 500 can be stepped around aperture 505 (e.g., by removing inner layers) if needed for example, to create a gradual taper that will allow for the smallest hole possible to reduce heat loss and to reduce stresses in the film around the hole.

Recesses 510 are also formed around the periphery of core 500 and will form overlap joint 220 once core 500 is formed into the final upper vacuum insulation panel 200. If multiple layers of material are used to form core 500, this can be done by having bottom layers of a first diameter and upper layers at a second diameter, larger than the first diameter of the bottom layers. In the example described above, the lower layers would have a diameter that would be 3 inches smaller than the upper layers to create a 1.5 inch recess/overlap joint all around.

A series of angular slots 515 are cut into core 500 to allow core 500 to be shaped from a flat disc to its final arcuate, dome shaped design without distortion or bunching of the core material. In the example shown, six angular slots 515 are cut symmetrically around core 500, however, any number of slots 515 could be used and positioned about core 500 in other manners as desired. In addition, if multiple layers of material are used to form core 500, each layer could be rotated and offset from the adjacent layer (e.g., approximately 15 degrees), which could remove the butt joints that would be formed with straight slots and allow the various portions of core 500 to overlap when formed into the dome shape, thereby reducing or eliminating through gaps and seams that can occur when straight through slots are used.

Once formed, core 500 is placed in a multi-layer barrier bag, such as an aluminum foil barrier bag, and placed in a preform vacuum fixture that forces the panel into the dome shape. A vacuum is then drawn, preferably to approximately 0.05 Torr, and the barrier bag is sealed to maintain the vacuum in the bag. Once sealed, the resulting panel is post formed by pressing between an inner casing and an outer casing making the size and shape of the final panel to form fit into the desired shape. This can be done by hand, with a hydraulic press, or by any other appropriate means. Excess material is finally trimmed from the edges of the barrier bag to form the final upper vacuum insulation panel 200.

Figure 2C:
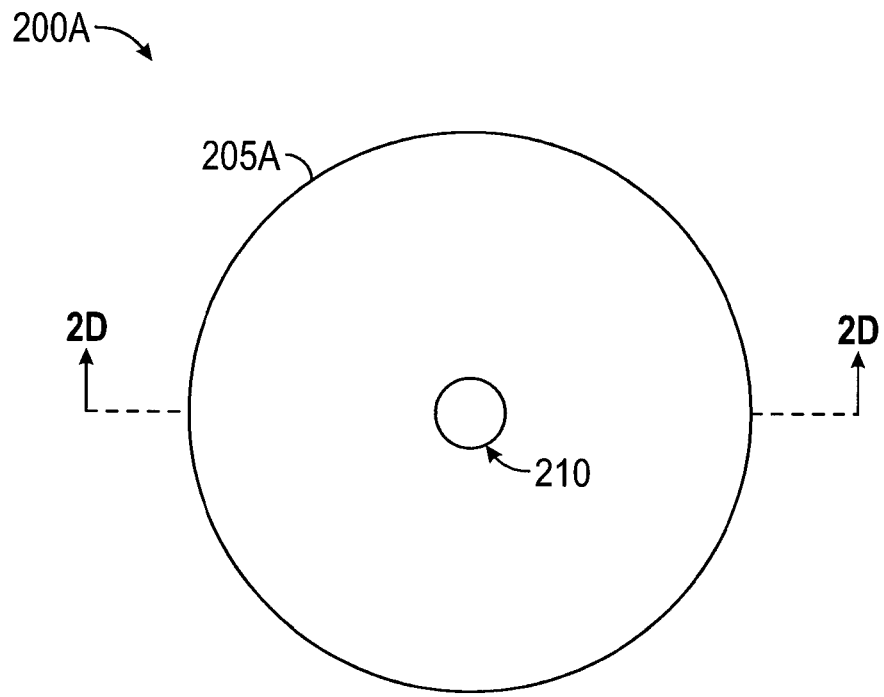
FIG. 2C is a top view of another example upper vacuum insulation panel.
Figure 2D:
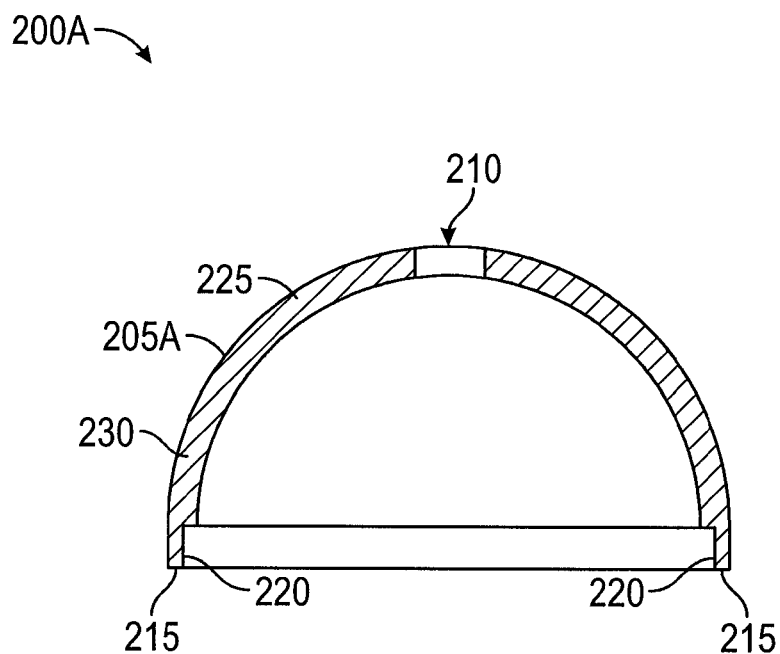
FIG. 2D is a cross-sectional view of the upper vacuum insulation panel of FIG. 2C taken along line 2D-2D.

Referring to FIGS. 2C and 2D, another example upper vacuum insulation panel 200A is provided, which is similar to upper vacuum insulation panel 200 in FIGS. 2A and 2B, with the addition of a cylindrical extension to the body. Upper vacuum insulation panel 200A has a body 205A having a first portion 225 and a second portion 230. In the example shown, first portion 225 is arcuate and generally dome shaped and has a thickness of approximately 0.5 inches. Aperture 210 is formed in the top of first portion 225 and is sized to allow passage of a nipple of the inner casing/bottle of the tank. In the example shown, aperture 210 is approximately 1.25 inches in diameter. Second portion 230 is generally cylindrical, also has a thickness of approximately 0.5 inches, and extends from the edge of first portion 225. At the edge 215 of second portion 230, overlap joint 220 is formed, which is configured to engage another overlap joint in the side panels 400 and encapsulate side panels 400 to hold assembly 100 together when installed over an inner bottle/casing of the tank, as described in greater detail below. In the example shown, overlap joint 220 is formed by a recess, creating a lap joint that extends approximately 1.5 inches. Alternatively, overlap joint 220 could be any other overlap joint as well, such as a dove tail, tongue and groove, or miter joint, as long as there is some overlap of insulation to remove any potential gaps between panels.

Figure 6:
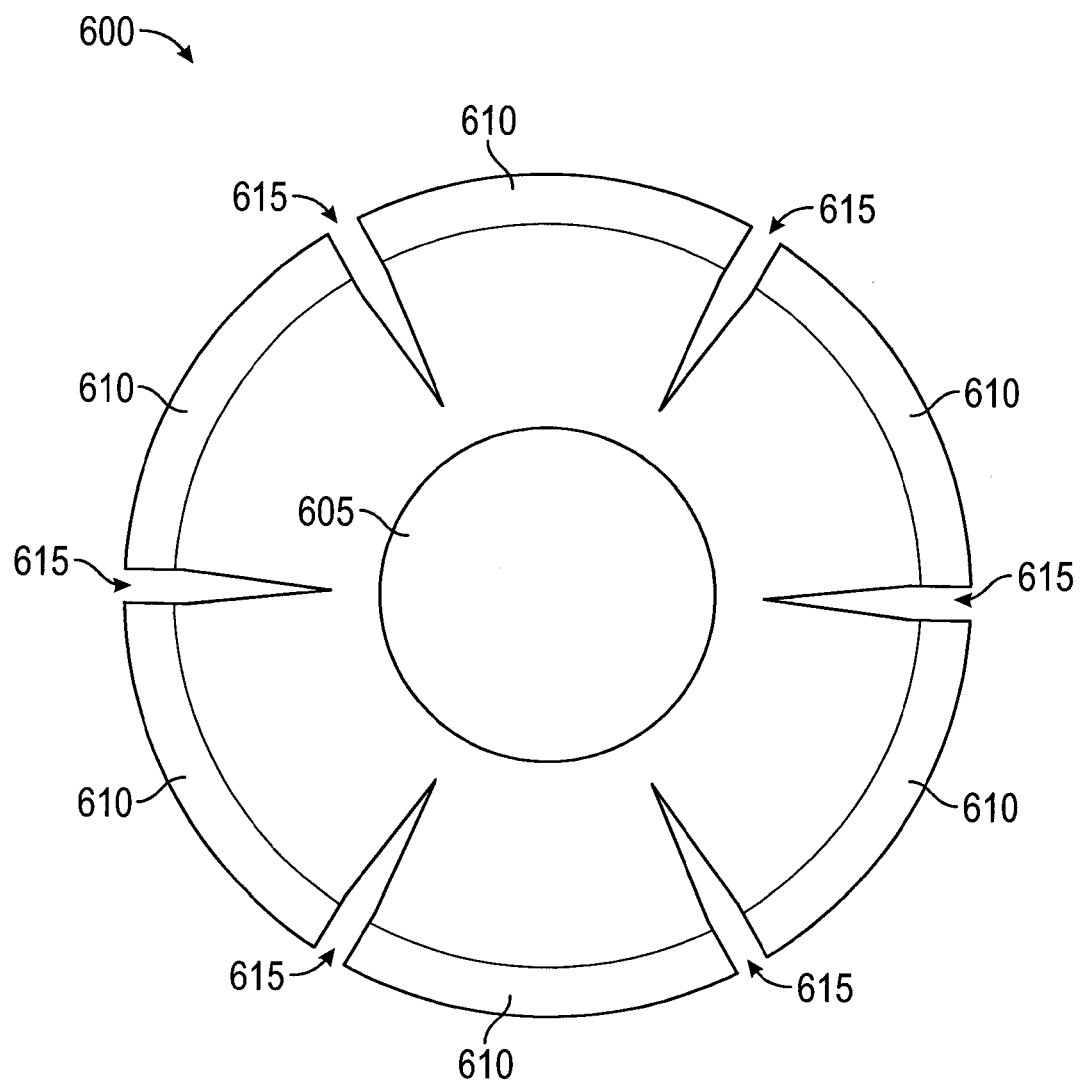
FIG. 6 is a top view of another example core for use in the upper vacuum insulation panel of FIGS. 2C and 2D.

To create upper vacuum insulation panel 200A, a core 600 is first formed, as shown in FIG. 6, preferably from a glass micro-fiber or other suitable product. Core 600 starts as a generally flat disc and while core 600 can be a single integral piece, preferably core 600 is made from multiple thin sheets that together form the desired thickness of the upper vacuum insulation panel 200A. An aperture 605 is formed in the center of core 600, which corresponds to aperture 210 in the final upper vacuum insulation panel 200A. Aperture 605 can be formed slightly larger than the end size of aperture 210 to allow for material overhang once core 600 is sealed into a barrier bag. In addition, if multiple layers of material are used, the layers of core 600 can be stepped around aperture 605 (e.g., by removing inner layers) if needed for example, to create a gradual taper that will allow for the smallest hole possible to reduce heat loss and to reduce stresses in the film around the hole.

Recesses 610 are also formed around the periphery of core 600 and will form overlap joint 220 once core 600 is formed into the final upper vacuum insulation panel 200A. If multiple layers of material are used to form core 600, this can be done by having bottom layers of a first diameter and upper layers at a second diameter, larger than the first diameter of the bottom layers. In the example described above, the lower layers would have a diameter that would be 3 inches smaller than the upper layers to create a 1.5 inch recess/overlap joint all around.

A series of slots 615 are cut into core 600 to allow core 600 to be shaped from a flat disc to its final shaped design without distortion or bunching of the core material. In the example shown, a first portion of slots 615, nearest aperture 605, are angular and a second portion of slots 615, furthest from aperture 605 are rectangular and have parallel sides. With this design, the angled first portion of slots 615 will create the arcuate/dome shaped portion 225 of panel 200A and the parallel second portion of slots 615 will create the cylindrical portion 230 of panel 200A. Also, in the example shown, six slots 615 are cut symmetrically around core 600, however, any number of slots 615 could be used and positioned about core 600 in other manners as desired. In addition, if multiple layers of material are used to form core 600, each layer could be rotated and offset from the adjacent layer (e.g., approximately 15 degrees), which could remove the butt joints that would be formed with straight slots and allow the various portions of core 600 to overlap when formed into shape, thereby reducing or eliminating through gaps and seams that can occur when straight through slots are used.

Once formed, core 600 is placed in a multi-layer barrier bag, such as an aluminum foil barrier bag, and placed in a preform vacuum fixture that forces the panel into the desired shape. A vacuum is then drawn, preferably to approximately 0.05 Torr, and the barrier bag is sealed to maintain the vacuum in the bag. Once sealed, the resulting panel is post formed by pressing between an inner casing and an outer casing making the size and shape of the final panel to form fit into the desired shape. This can be done by hand, with a hydraulic press, or by any other appropriate means. Excess material is finally trimmed from the edges of the barrier bag to form the final upper vacuum insulation panel 200.

Figure 3A:
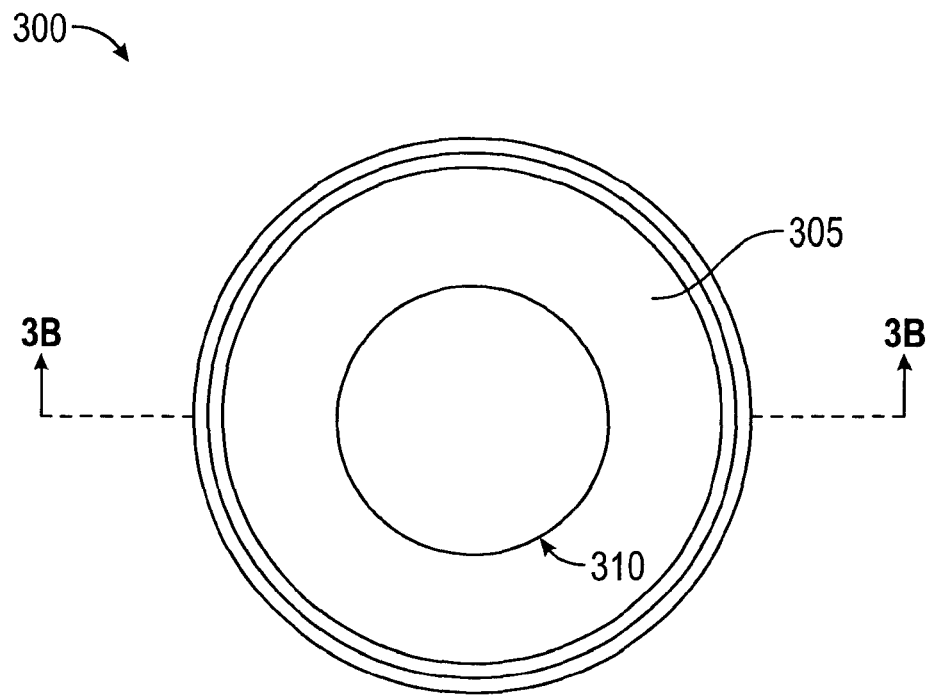
FIG. 3A is a top view of an example lower vacuum insulation panel.
Figure 3B:
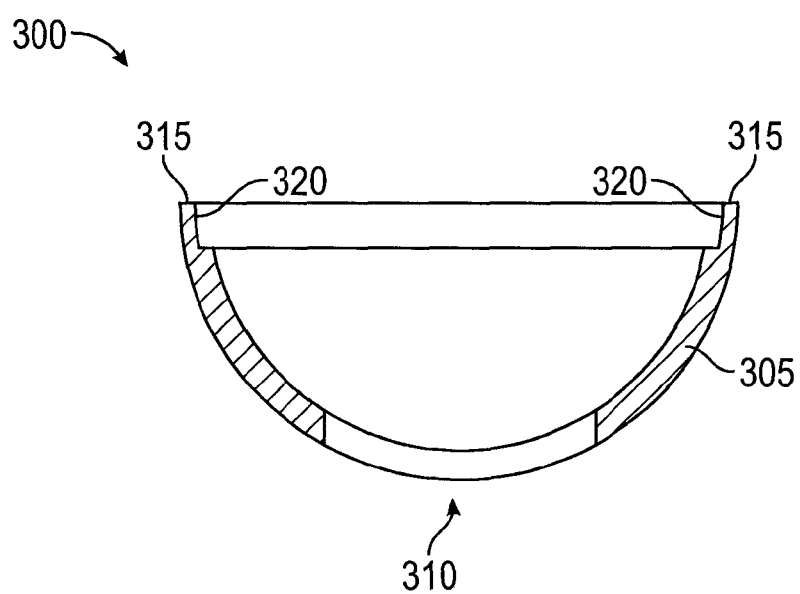
FIG. 3B is a cross-sectional view of the lower vacuum insulation panel of FIG. 3A taken along line 3B-3B.

Referring to FIGS. 3A and 3B, the example lower vacuum insulation panel 300 has a body 305 that is arcuate and generally dome shaped and has a thickness of approximately 0.5 inches. However, depending on the size and shape of the tank and the insulation properties desired, lower vacuum insulation panel 300 could have any shape desired, such as a flat disc, cylinder, cone, etc., and a thickness appropriate to the design and desired thermal properties. An aperture 310 is formed in the bottom of lower vacuum insulation panel 300 and is sized to allow passage of heating elements or other plumbing/fixtures if needed. Aperture 310 allows for a one piece dome shape to be constructed by allowing the heating elements to go through the center of the panel. In the example shown, aperture 310 is approximately 6-8 inches in diameter. At the edge 315 of lower vacuum insulation panel 300 an overlap joint 320 is formed, which is configured to engage another overlap joint in the side panels 400, as described in greater detail below. In the example shown, overlap joint 320 is formed by a recess, creating a lap joint that extends approximately 1.5 inches. Alternatively, overlap joint 320 could be any other overlap joint as well, such as a dove tail, tongue and groove, or miter joint, as long as there is some overlap of insulation to reduce or eliminate any potential gaps between panels. The single piece dome shape described above reduces or eliminates the edge effect heat loss that occurs with current multi-piece dome constructions.

To create lower vacuum insulation panel 300, a core 500 is first formed, as shown in FIG. 5 and described in detail above. For lower vacuum insulation panel 300, aperture 505 is formed in the center of core 500 and corresponds to aperture 310 in the final lower vacuum insulation panel 300. In this case, aperture 505 can be formed slightly larger than the end size of aperture 310 to allow for material overhang once core 500 is sealed into a barrier bag. In addition, if multiple layers of material are used, the layers of core 500 can be stepped around aperture 505 (e.g., by removing inner layers) if needed.

Once formed, core 500 is placed in a multi-layer barrier bag, such as an aluminum foil barrier bag, and placed in a preform vacuum fixture that forces the panel into the dome shape. A vacuum is then drawn, preferably to approximately 0.05 Torr, and the barrier bag is sealed to maintain the vacuum in the bag. Once sealed, the resulting panel is post formed by pressing between an inner casing and an outer casing making the size and shape of the final panel to form fit into the desired shape. This can be done by hand, with a hydraulic press, or by any other appropriate means. Excess material is finally trimmed from the edges of the barrier bag to form the final lower vacuum insulation panel 300.

Alternatively, lower vacuum insulation panel 300 can also be formed with body 305 having a first portion that is dome shaped and a second portion that is cylindrical and extends from the first portion, as described above for vacuum insulation panel 200A and shown in FIGS. 2C and 2D.

Figure 4A:
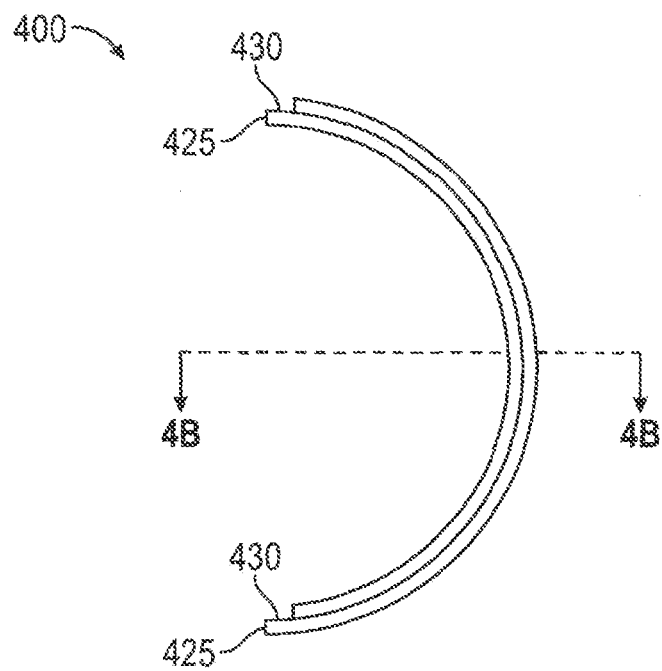
FIG. 4A is a top view of an example side vacuum insulation panel.
Figure 4B:
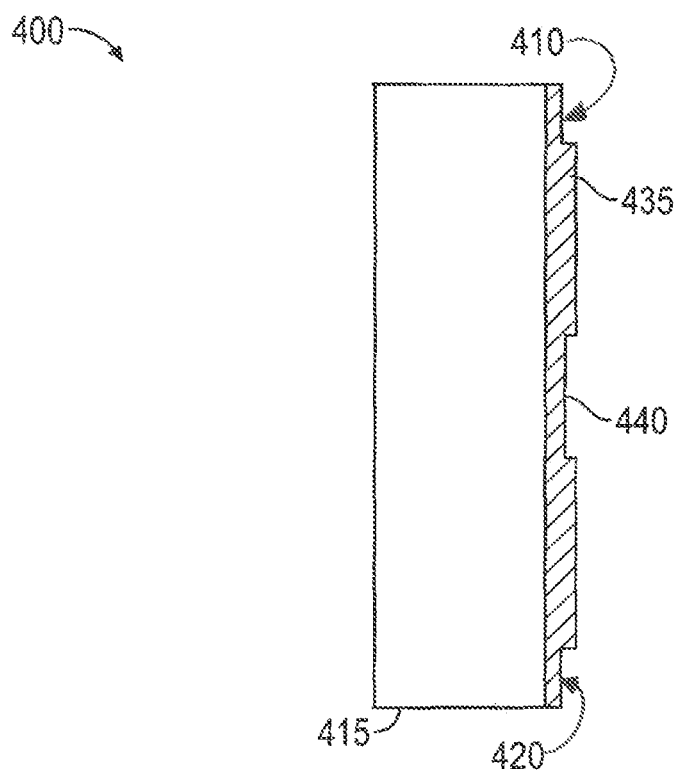
FIG. 4B is a cross-sectional view of the side vacuum insulation of FIG. 4A taken along line 4B-4B.

Referring to FIGS. 4A and 4B, an example side vacuum insulation panel 400 is shown. In the example vacuum panel insulation assembly 100 described herein, the first and second side vacuum insulation panels are identical and, therefore, both will be described with reference to example side vacuum insulation panel 400. The example side vacuum insulation panel 400 is arcuate and generally cylindrical in shape, forming a half cylinder, and has a thickness of approximately 0.625 inches. However, depending on the size and shape of the tank and the insulation properties desired, side vacuum insulation panel 400 could have any shape desired and a thickness appropriate to the design and desired thermal properties.

At top edge 405 of side vacuum insulation panel 400 an overlap joint 410 is formed, which is configured to engage overlap joint 220 in top vacuum insulation panel 200. As above, in the example shown, overlap joint 410 is formed by a recess, creating a lap joint that extends approximately 1.5 inches. Alternatively, overlap joint 410 could be any other overlap joint as well, such as a dove tail, tongue and groove, or miter joint, to match the overlap joint used in the upper panel. At bottom edge 415 of side vacuum insulation panel 400 an overlap joint 420 is formed, which is configured to engage overlap joint 320 in bottom vacuum insulation panel 300. As above, in the example shown, overlap joint 420 is formed by a recess, creating a lap joint that extends approximately 1.5 inches. Alternatively, overlap joint 420 could be any other overlap joint as well, such as a dove tail, tongue and groove, or miter joint, to match the overlap joint used in the lower panel. At side edges 425 of side vacuum insulation panel 400 overlap joints 430 are formed. To be able to use a common side panel for both the first and second side panels of the assembly, overlap joints 430 are formed in opposite configurations (e.g., one male and one female) and are configured to engage an opposite overlap joint 430 in another side vacuum insulation panel 400. As above, in the example shown, overlap joints 430 are formed by a recess, creating a lap joint that extends approximately 1.5 inches. Alternatively, overlap joints 430 could be any other overlap joint as well, such as a dove tail, tongue and groove, or miter joint.

In the particular example shown, an elongated channel 440 is formed in outer surface 435 of side vacuum insulation panel 400. Elongated channel 440 can be used to receive and position a "belly band" or other device or material to protect side vacuum insulation panel 400 when the outer casing of the tank is assembled and welded, as described in more detail below.

To create side vacuum insulation panel 400, a generally rectangular core is first formed, preferably from a glass micro-fiber or other suitable product. The core can be a single integral piece, but preferably the core is made from multiple thin sheets that together form the desired thickness of side vacuum insulation panel 400. Recesses are formed around the periphery of the core and will form overlap joints 410, 420, and 430 once the core is formed into the final side vacuum insulation panel 400. A recess is also formed in an outer surface of the core and will form elongated channel 440 once the core is formed into the final side vacuum insulation panel 400. If multiple layers of material are used to form the core, the recesses for the overlap joints and the channel can be formed by having top and bottom layers of different lengths and widths, which when stacked will form the appropriate recesses needed.

Once formed, the core is placed in a barrier bag, such as an aluminum foil barrier bag, and placed in a vacuum fixture. A vacuum is then drawn, preferably to approximately 0.05 Torr, and the barrier bag is sealed to maintain the vacuum in the bag. Once sealed, the resulting panel is rolled into a half cylindrical shape, similar to methods used for rolling steel shells. Excess material is finally trimmed from the edges of the barrier bag to form the final side vacuum insulation panel 400.

Figure 4C:
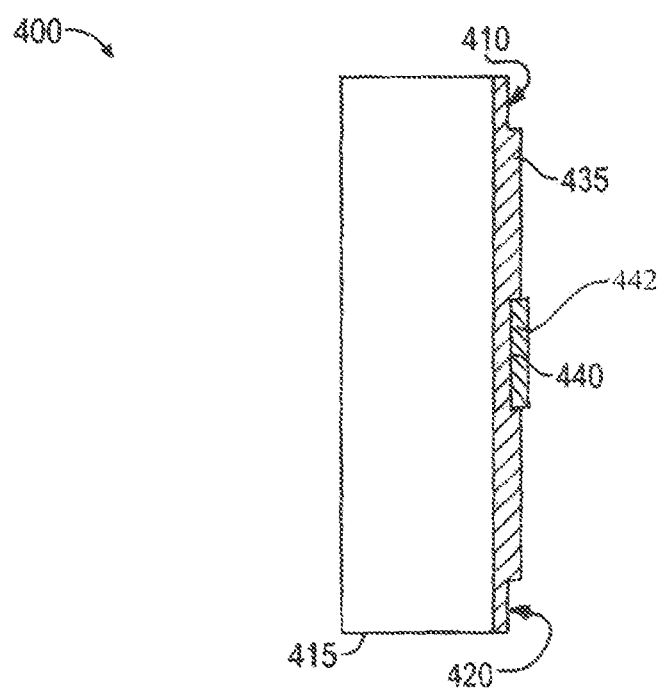
FIG. 4C is a cross-sectional view of an alternative side vacuum insulation with heat resistant material.

To assemble a tank using the example vacuum insulation panel assembly described above, the upper, lower, and two side vacuum insulation panels 200, 300, 400 are made as described above. Each of the vacuum insulation panels 200, 300, 400 are then assembled around the inner bottle/casing of the tank. The vacuum insulation panels 200, 300, 400 can be held in place with an adhesive applied to the lap joints before or during assembly, or by any other well known method. In addition to securing the vacuum insulation panels during assembly, use of an adhesive can also provide a better seal and assist with the insulating properties of the vacuum panel insulation assembly 100. As shown in FIG. 4C, an optional heat resistant material 442, such as a glass micro-fiber, is positioned within elongated channel 440 in side vacuum insulation panels 400 and can also be secured in place using an adhesive or any other well known means. A welding shield (e.g., a sheet steel band) is positioned within elongated channel 440 in side vacuum insulation panels 400 over the heat resistance material and can also be secured if needed. The heat resistant material and the welding shield allow welding of the upper and lower portions of the outer casing of the tank without damaging the side vacuum insulation panels 400. If the outer casing of the tank is not welded, the heat resistant material and welding shield can be disregarded.

The fully assembled inner bottle/casing, vacuum insulation panel assembly 100, heat resistant material and welding shield are then inserted into the bottom portion of the outer casing of the tank such that the top edge of the bottom portion aligns with the welding shield. The top portion of the outer casing of the tank is then placed over the assembly such that the top portion and the bottom portion meet somewhere over the welding shield. The top portion and the bottom portion of the tank are then girth welded to complete the tank.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A vacuum insulation panel assembly, comprising:
   an upper vacuum insulation panel having a top outer surface and a bottom inner surface, an aperture formed therethrough and a recess formed along a bottom edge in the bottom inner surface for forming an overlap joint portion;
   a lower vacuum insulation panel having a bottom outer surface and top inner surface, an aperture formed therethrough and a recess formed along a top edge in the top inner surface for forming an overlap joint portion;
   an arcuate, half-cylindrical first side vacuum insulation panel having an outer convex surface and an inner concave surface, the first side vacuum insulation panel having:
   (i) at least one to recess formed in a top edge of the outer convex surface, the at least top one recess configured to fit within and engage the recess in the upper vacuum insulation panel thereby forming an overlap joint with the upper vacuum insulation panel,
   (ii) at least one bottom recess formed in a bottom edge of the outer convex surface, the at least one bottom recess configured to fit within and engage the recess in the lower vacuum insulation panel thereby forming an overlap joint with the lower vacuum insulation panel, and
   (iii) first and second side edges, the first and second side edges each having at least one side recess for forming an overlap joint portion; and
   an arcuate, half-cylindrical second side vacuum insulation panel having an outer convex surface and an inner concave surface, the second side vacuum insulation panel having:
   (i) at least one top recess formed in a top edge of the outer convex surface, the at least one top recess configured to fit within and engage the at least one recess in the upper vacuum insulation panel thereby forming an overlap joint with the upper vacuum insulation panel,
   (ii) at least one bottom recess formed in a bottom edge of the outer convex surface, the at least one bottom recess configured to fit within and engage the recess in the lower vacuum insulation panel thereby forming an overlap joint with the lower vacuum insulation panel, and
   (iii) first and second side edges, the first and second side edges each having at least one side recess configured to engage the at least one side recesses formed in each of the first and second side edges of the first side vacuum insulation panels to thereby form overlap joints,
   wherein the vacuum insulation panels are held together with an adhesive on each overlap joint.

2. The vacuum insulation panel assembly of claim 1, wherein the upper vacuum insulation panel is arcuate and dome shaped, having a top outer convex surface and a bottom inner concave surface, wherein the recess is formed along a bottom edge of the bottom inner concave surface.

3. The vacuum insulation panel assembly of claim 1, wherein the upper vacuum insulation panel comprises a first portion and a second portion, the first portion of the upper vacuum insulation panel is arcuate and dome shaped, the second portion of the upper vacuum insulation panel being cylindrical and extends from the first portion, and the recess is disposed along an inner surface of the second portion.

4. The vacuum insulation panel assembly of claim 1, wherein the lower vacuum insulation panel is arcuate and dome shaped, having a bottom outer convex surface and a top inner concave surface. wherein the recess is formed along a top edge of the top inner concave surface.

5. The vacuum insulation panel assembly of claim 1, wherein the lower vacuum insulation panel comprises a first portion and a second portion, the first portion of the lower vacuum insulation panel is arcuate and dome shaped, the second portion of the lower vacuum insulation panel being cylindrical and extends from the first portion, and the recess is disposed along an inner surface of the second portion.

6. The vacuum insulation panel assembly of claim 1, wherein the overlap joints comprise at least one of lap joints, dove tail joints, tongue and groove joints, and miter joints.

7. The vacuum insulation panel assembly of claim 6, wherein the overlap joints are lap joints.

8. The vacuum insulation panel assembly of claim 1, wherein the upper, lower, and side vacuum panels have, an R-value of approximately R-45/inch or greater.

9. The vacuum insulation panel assembly of claim 1, wherein the side panels each have an elongated channel formed on the outer convex surfaces.

10. The vacuum insulation panel assembly of claim 9, further comprising a heat resistance member adhered within each channel of the side vacuum insulation panels.

* * * * *